May 16, 1939. V. H. DOLPH 2,158,277
SHEARS
Original Filed Nov. 2, 1937 2 Sheets-Sheet 1
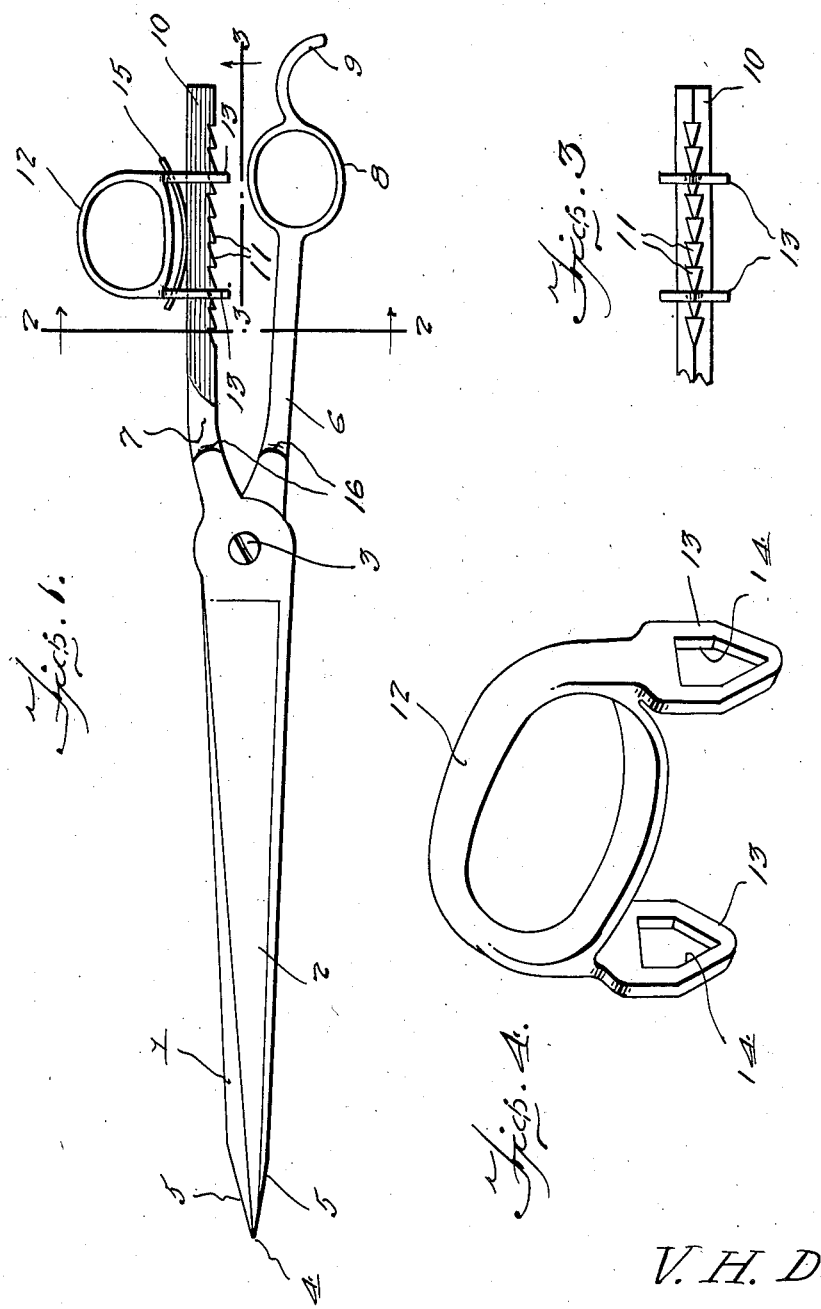

May 16, 1939. V. H. DOLPH 2,158,277
SHEARS
Original Filed Nov. 2, 1937 2 Sheets-Sheet 2
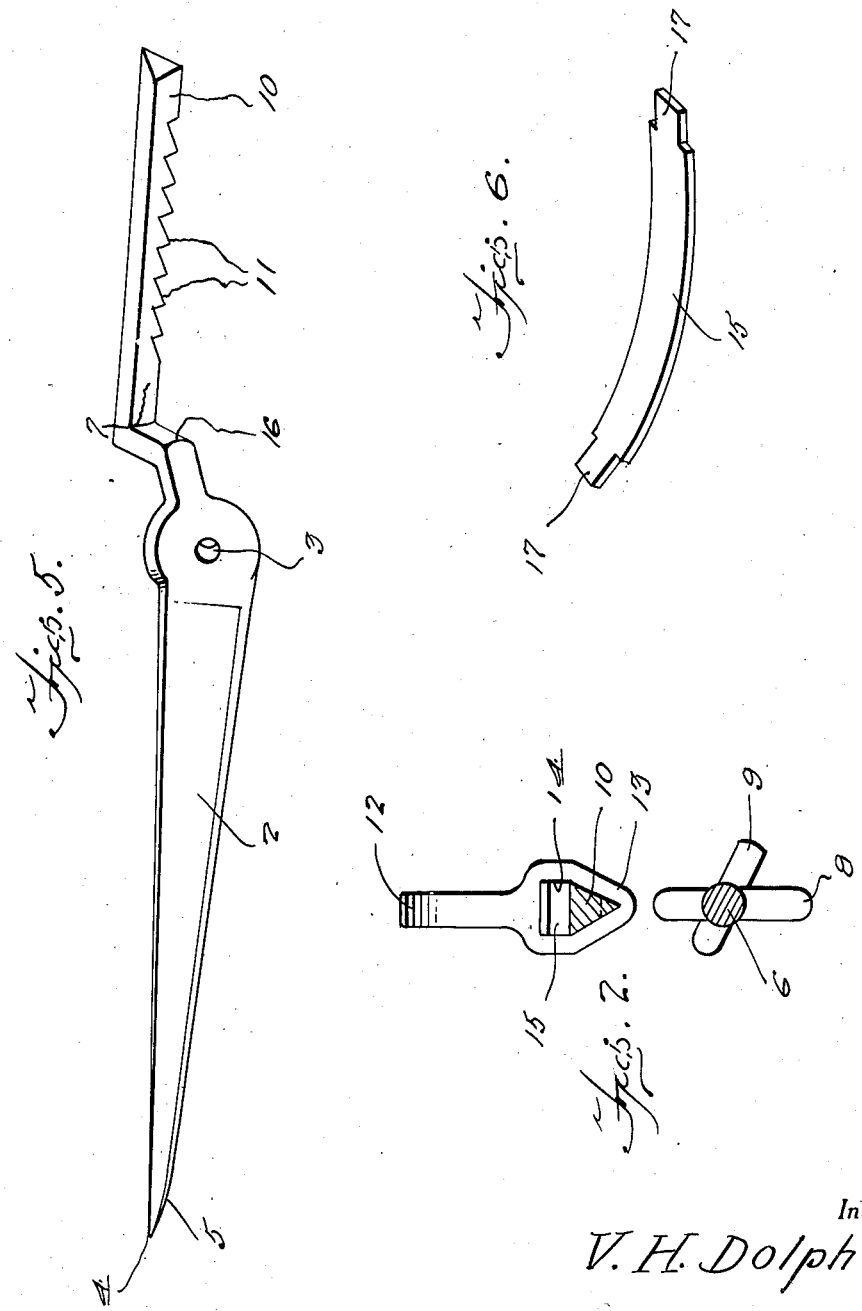
Inventor
V. H. Dolph
By Clarence A. O'Brien
Hyman Berman
Attorneys Patented May 16, 1939

2,158,277

UNITED STATES PATENT OFFICE 2,158,277

SHEARS

Vern Harlan Dolph, Fort Lupton, Colo.

Application November 2, 1937, Serial No. 172,445
Renewed February 23, 1939

2 Claims. (Cl. 30—341)

The present invention relates to new and useful improvements in shears particularly for barbers and has for its primary object to provide, in a manner as hereinafter set forth, an instrument of this character embodying a novel construction and arrangement of adjustable thumb ring for eliminating cramps in the hand of the operator.

Other objects of the invention are to provide shears of the aforementioned character which will be comparatively simple in construction, strong, durable, highly efficient and reliable in use, light in weight, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a shears constructed in accordance with the present invention.

Figure 2 is a cross sectional view, taken substantially on the line 2—2 of Fig. 1.

Figure 3 is a fragmentary view in bottom plan, looking from the line 3—3 of Fig. 1.

Figure 4 is a detail view in perspective of the adjustable thumb ring.

Figure 5 is a detail view in perspective of the blade and handle on which the adjustable thumb ring is mounted.

Figure 6 is a detail view in perspective of the spring.

Referring now to the drawings in detail, it will be seen that the embodiment of the invention which has been illustrated comprises a pair of blades 1 and 2 which are pivotally connected at one end, as at 3. At their free ends, the blades 1 and 2 terminate in points 4. The blades 1 and 2 gradually taper from their pivotally connected ends to a point adjacent their free ends where the taper becomes comparatively abrupt, as at 5.

Projecting from the pivoted ends of the blades 1 and 2 and integral therewith are operating handles 6 and 7, respectively. On the free end of the handle 6 is an integral finger ring 8 from which an arcuate member 9 extends for receiving the little finger of the operator's hand.

The major portion of the handle 7 is substantially triangular in cross section, as at 10, and the lower edge thereof is provided with teeth 11. Mounted for sliding adjustment on the portion 10 of the handle 7 is a thumb ring 12. Extending downwardly from the ring 12 and integral therewith are opposed supporting arms or loops 13 having openings 14 therein which accommodates the handle 7. As illustrated to advantage in Fig. 4 of the drawings, the lower portion of the openings 14 conform in shape to the substantially triangular portion 10 of the handle 7. Further, the openings 14 are elongated to allow sufficient movement to permit disengagement from the teeth 11 for adjusting the thumb ring 12 to the desired position.

The reference numeral 15 designates an arcuate spring which is mounted between the thumb ring 12 and the portion 10 of the handle 7. At an intermediate point, the spring 15 bears on the portion 10 of the handle 7. The end portions of the spring 15 are engaged in the openings 14 for yieldingly urging the thumb ring 12 upwardly or away from the handle 7 for engaging the loops 13 with the teeth 11. This is shown to advantage in Fig. 1 of the drawings.

It will thus be seen that a pair of shears for barbers has been provided wherein the thumb ring may be expeditiously adjusted to suit the individual operator, thus eliminating cramps in the hand as well as promoting efficiency in the use of said shears. To adjust the thumb ring 12 it is only necessary to press downwardly against the tension of the spring 15 sufficiently to disengage the teeth 11, after which said thumb ring may be moved to any desired position on the handle 7. When released, the thumb ring 12 is immediately raised by the arcuate spring 15 for engaging the arms or loops 13 with the teeth 11, thereby securely holding said thumb ring in adjusted position. The handle 6 and 7, it will be observed, are offset, as at 16. It will also be noted that the end portions of the spring 15 are reduced, as at 17, for engagement in the openings 14 in a manner to prevent longitudinal movement of said spring.

It is believed that the many advantages of a pair of shears constructed in accordance with the present invention will be readily understood and although a preferred embodiment of the instument is as illustrated and described, it is to be understood that changes in the details of construction and in the combination and arrangement of parts may be resorted to which will fall within the scope of the invention as claimed.

What is claimed is:

1. A pair of shears comprising a pair of blades pivotally connected at one end, operating handles extending from the pivoted ends of the blades, teeth on one of the handles, a thumb ring mounted for longitudinal sliding adjustment on said one handle and including loops encircling same, and a spring mounted between the thumb ring and said one handle and having its end portions engaged in the loops for engaging said loops with the teeth for releasably securing the thumb ring in adjusted position.

2. A pair of shears comprising a pair of blades pivotally connected at one end, operating handles extending from the pivoted ends of the blades, one of said handles being substantially triangular in cross section and including a series of teeth, a thumb ring, opposed loops depending from said thumb ring and slidable on said one handle, said loops conforming substantially to the cross sectional shape of said one handle and engageable with the teeth, and an arcuate spring mounted between the ring and said one handle and having its intermediate portion engaged with said one handle and its end portions engaged in the loops for engaging said loops with the teeth.

VERN HARLAN DOLPH.